United States Patent
Hans et al.

(10) Patent No.: US 7,289,536 B2
(45) Date of Patent: Oct. 30, 2007

(54) METHOD FOR SIGNALING DIFFERENT HEADER INFORMATION

(75) Inventors: Martin Hans, Hildesheim (DE); Frank Kowalewski, Salzgitter (DE); Josef Laumen, Hildesheim (DE); Gunnar Schmidt, Wolfenbuettel (DE); Siegfried Baer, Pforzheim (DE); Mark Beckmann, Braunschweig (DE); Thomas Gottschalk, Braunschweig (DE)

(73) Assignee: IPCom GmbH & Co. KG, Hoellriegelskreuth (DE)

( * ) Notice: Subject to any disclaimer, the term of this patent is extended or adjusted under 35 U.S.C. 154(b) by 998 days.

(21) Appl. No.: 10/240,128

(22) PCT Filed: Mar. 22, 2001

(86) PCT No.: PCT/DE01/01115

§ 371 (c)(1),
(2), (4) Date: Sep. 27, 2002

(87) PCT Pub. No.: WO01/74022

PCT Pub. Date: Oct. 4, 2001

(65) Prior Publication Data

US 2003/0103513 A1 Jun. 5, 2003

(30) Foreign Application Priority Data

Mar. 29, 2000 (DE) ................................. 100 15 640

(51) Int. Cl.
*H04J 3/24* (2006.01)

(52) U.S. Cl. ....................................... 370/474; 370/473
(58) Field of Classification Search ...................... None
See application file for complete search history.

(56) References Cited

U.S. PATENT DOCUMENTS 6,542,504 B1 * 4/2003 Mahler et al. ............... 370/392

(Continued)

OTHER PUBLICATIONS

Lou Berger Et Al: "MPLS/IP Header Compression", Internet Draft, Networking Group, Online, Jan. 2000, pp. 1-12.

(Continued)

*Primary Examiner*—Phirin Sam
(74) *Attorney, Agent, or Firm*—Michael J. Striker

(57) ABSTRACT

The invention proposes a method for signaling various header data (5, 10, 20, 25) in the transmission of packet data units (1) in a telecommunications network depending on a type of the respective header data (5, 10, 20, 25), which requires the lowest possible bandwidth and bit rate. A set of header data (5, 10, 20, 25) received in a receiver (70) of the telecommunications network, depending on its signaling (30, 35, 40), is supplied to one of at least two groups (50, 55) of algorithms for an evaluation. For a first type of header data (5, 10, 20, 25), a first algorithm is provided in a first group (50) of algorithms, and for a second type of header data (5, 10, 20, 25) a second algorithm is provided in a second group (55) of algorithms, wherein the first algorithm corresponds to the second algorithm. The signaling (30, 35, 40) for the first type of header data (5, 10, 20, 25) and the signaling (30, 35, 40) for the second type of header data (5, 10, 20, 25) are combined into a shared signaling.

12 Claims, 2 Drawing Sheets

U.S. PATENT DOCUMENTS

| | | | |
|---|---|---|---|
| 6,804,238 B1 * | 10/2004 | Euget et al. | 370/392 |
| 6,882,637 B1 * | 4/2005 | Le et al. | 370/349 |
| 7,069,495 B2 * | 6/2006 | Soderberg et al. | 714/776 |
| 2003/0097474 A1 * | 5/2003 | Defosse et al. | 709/246 |
| 2004/0202167 A1 * | 10/2004 | Jonsson et al. | 370/392 |

OTHER PUBLICATIONS

Casner Et Al: "Compressing IP/UDP/RTP . . . " IETF Request for Comments, Feb. 99, pp. 1-21.

Fabri S.N. Et Al: "Proposed Evolution of GPRS for the Support of Voive Services", IEE Proceedings: Communications, Institution of Electrical Engineers, BG, vol. 146, No. 5, Oct. 14, 1999, pp. 325-330.

Lou Berger, Jason Jeffords: "MPLS/IP Header Compression" Internet Draft, Network Working Group, 'Online! Jan. 2000, pp. 1-12, XP002171580. <url:http://sumin.dongeul.ac.kr/mpls/draft-berger-mpls-hdr-comp-oo.txt>.

Casner, S., Et Al : "Compressing IP/UDP/RTP Headers for Low-Speed Serial Links" IETF Request for Comments, XX, XX, Feb. 1999, pp. 1-23, XP02164554. The Internet Society (1999). RFC 2508.

Degermark, M., Et Al: "IP Header Compression" RFC 2507. Feb. 1999. Network Working Group. The Internet Society (1999). htpp://mirrors.dotsrc.org/rfc/rfc2507.text. pp. 1-44.

Jacobson, V. "Compressing TCP/IP Headers for Low-Speed Serial Links" RFC 1144. Network Working Group. Feb. 1990. pp. 1-43.

* cited by examiner

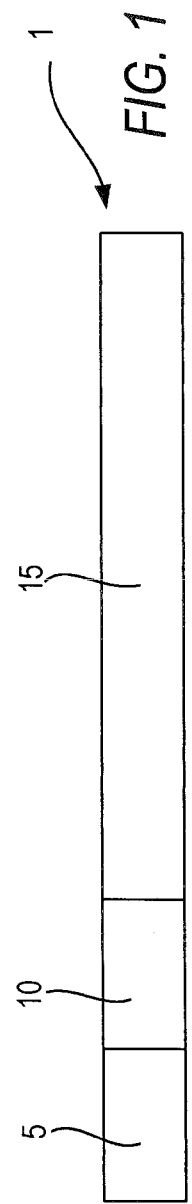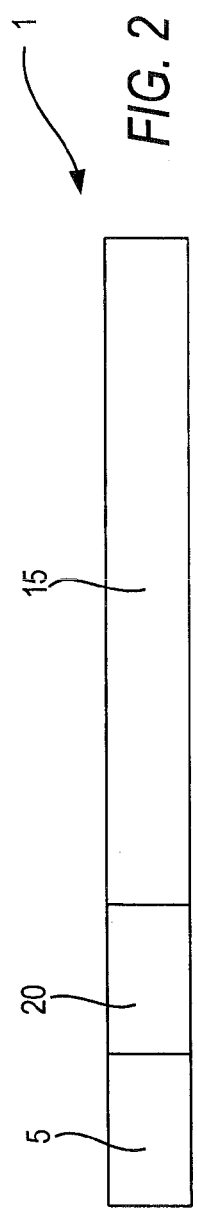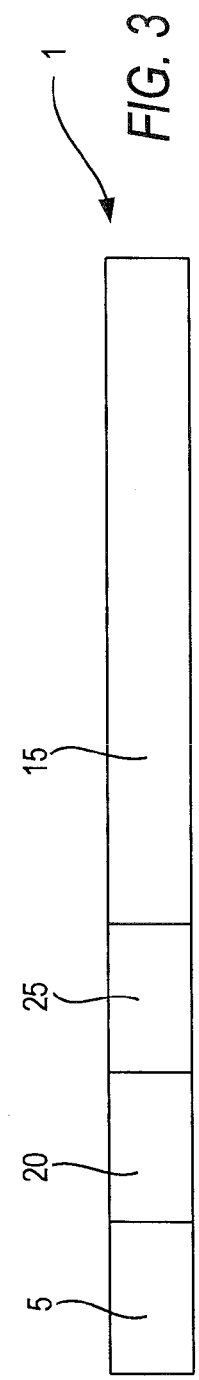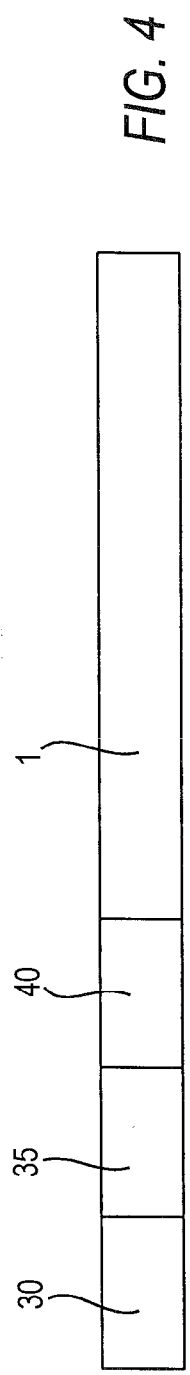

METHOD FOR SIGNALING DIFFERENT HEADER INFORMATION

CROSS-REFERENCE

The invention described and claimed hereinbelow is also described in PCT/DE01/01115, filed on Mar. 22, 2001 and DE 100 15 640.1, filed Mar. 29, 2000. This German Patent Application, whose subject matter is incorporated here by reference, provides the basis for a claim of priority of invention under 35 U.S.C. 119 (a)-(d).

BACKGROUND OF THE INVENTION

The invention is based on a method for signaling various header data.

In packet switched telecommunications networks, payload data are transmitted from a sender to a receiver in packet data units. The packet data units pass through a number of protocol layers in the sender before they are finally sent to the receiver via the telecommunications network. In the process, the individual protocol layers add header data in the form of so-called protocol control data to the actual payload data. These data are also referred to as "headers". The header data with the protocol control data and the payload data then respectively comprise a packet data unit. In this connection, the protocol control data are used for example to convey the respective packet data unit with the payload data through the telecommunications network to the receiver. As a result, an on the whole relatively large quantity of data can be combined for the protocol control data, which also have to be transported along with the payload data. Particularly in systems with limited bandwidth, as is the case, for example, in mobile radio systems or in telecommunication connections via modems, this especially impedes the bit rate available for the transmission of the payload data.

Compression algorithms are used to reduce the data quantity of the protocol control data. These compression algorithms are known, for example, from the documents RFC 1144, Compressing TCP/IP Headers for Low-Speed Serial Links (D1), RFC 2507, IP Header Compression, M. Degermark, B. Nordgren, S. Pink (D2), and RFC 2508, Compressing IP/UDP/RTP Headers for Low-Speed Serial Links (D3). Reference D2 has disclosed a first group of compression and decompression algorithms of IP headers (Internet Protocol) in combination with TCP headers (Transport Control Protocol) and UDP headers (User Dataframe Protocol). Reference D3 has disclosed a second group of compression and decompression algorithms, which are based on the compression and decompression algorithms described in reference D2, but are only used for IP/UDP/RTP headers (RTP=Real Time Protocol). If packet data units are transmitted from a sender that contains a compressor, to a receiver that contains a decompressor, then the decompressor must be notified as to the nature or type of header data that it is currently receiving. This is usually assured through a corresponding signaling in the form of additional data, as described in the specification "Subnetwork Dependent Convergence Protocol (SNDCP)", which are sent to the receiver along with the corresponding packet data unit. In this case, for some types of header data with different signaling, a first decompression algorithm is provided in the first group of algorithms and a second decompression algorithm is provided in the second group of algorithms, where the first decompression algorithm and the second decompression algorithm correspond to each other.

SUMMARY OF THE INVENTION

The method according to the invention has the advantage over the prior art that for the case in which, for a first type of header data, a first algorithm is provided in a first group of algorithms and for a second type of header data, a second algorithm is provided, in a second group of algorithms, where the first algorithm corresponds to the second algorithm, the signaling for the first type of header data and the signaling for the second type of header data are combined into a shared signaling. In this manner, the data quantity to be transmitted in order to send the signaling along with the corresponding packet data unit can be reduced so that the bit rate for the transmission of payload data is impeded as little as possible by the transmission of the signaling.

It is particularly advantageous that different types of header data with a shared signaling, depending on their signaling, are supplied to a shared algorithm from the first group and the second group of algorithms. As a result, no additional signaling is required for such header data in order to assign the header data ahead of time to one of the two groups of algorithms in order then, based on the additional signaling, to select from the preselected group the algorithm to be executed so that the above-described savings in data quantity is achieved for the signaling.

It is also advantageous that the header data of at least ten different types can be signaled by means of a 3-bit signaling. This is possible through the shared signaling of six of the ten different types and achieves a savings of one bit in comparison to a separate signaling of each different type of header data.

BRIEF DESCRIPTION OF THE DRAWINGS

An exemplary embodiment of the invention is shown in the drawings and will be explained in detail in the description follows.

FIG. 1 shows a packet data unit with header data of a first type,

FIG. 2 shows a packet data unit with header data of a second type,

FIG. 3 shows a packet data unit with header data of a third type,

FIG. 4 shows a packet data unit with a preceding signaling, and

DETAILED DESCRIPTION OF THE PREFERRED EMBODIMENTS

Figure 5:
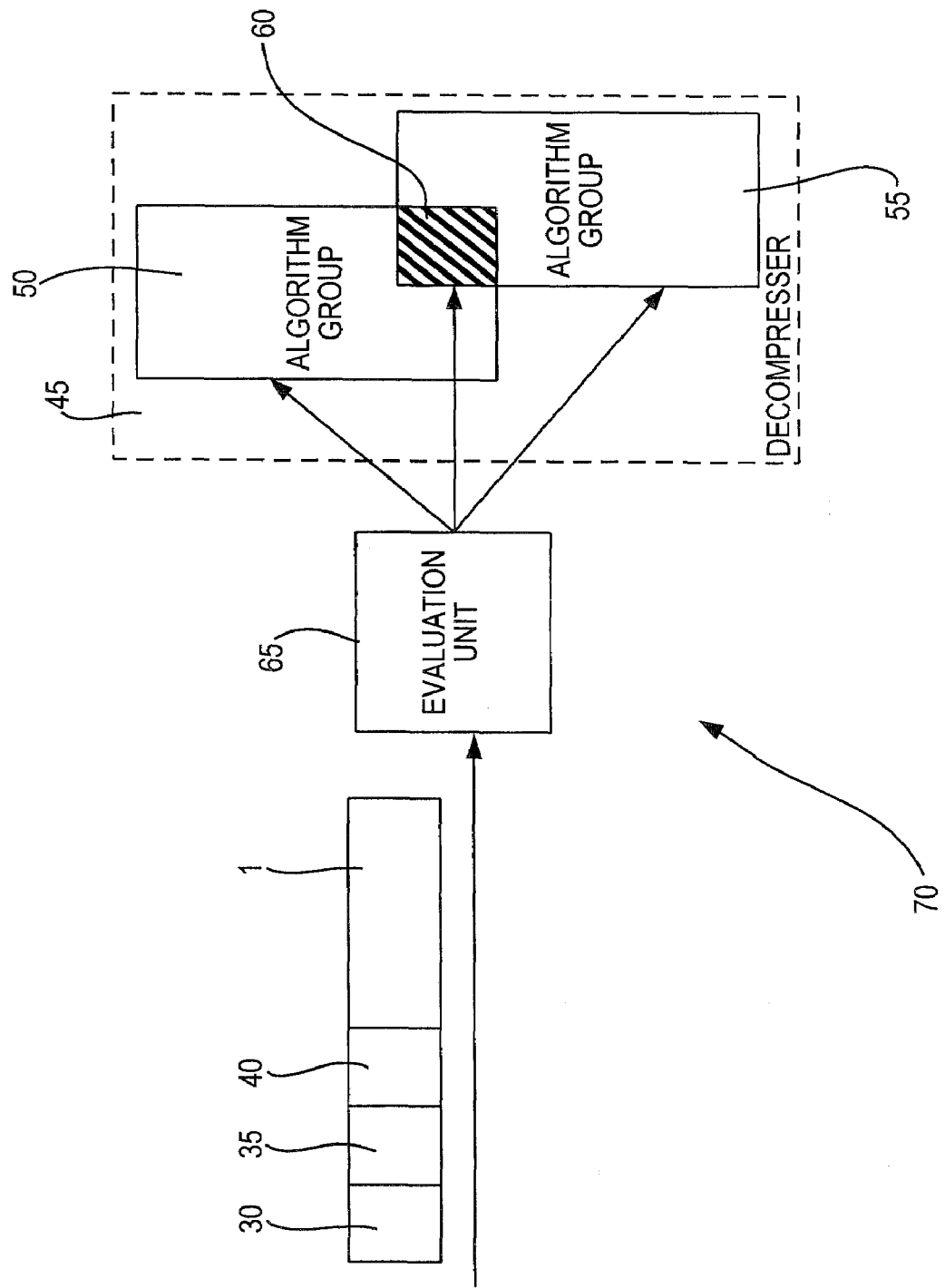
FIG. 5 shows a block circuit diagram of a receiver.

In packet switched telecommunications networks, payload data 15 according to FIG. 1 in the form of packet data units 1 are transmitted from a sender to a receiver 70 according to FIG. 5. The packet data units 1 pass through a number of protocol layers in the sender before they are finally sent. In the process, the individual protocol layers add so-called protocol control data in the form of header data, which are also referred to as "headers", to the payload data 15. The header data are labeled with the reference numerals 5, 10 in FIG. 1 and, together with the payload data 15, comprise the packet data unit 1 according to FIG. 1. In this connection, the header data 5, 10 are used for example to convey the packet data unit 1 with the payload data 15 through the telecommunications network to the receiver 70. In order to reduce the data quantity of the header data 5, 10, compression algorithms in the sender are used. The header data 5, 10 are then compressed with one of these compression algorithms and in this manner, are transmitted via the telecommunication network to the receiver 70 by means of the packet data unit 1. In the receiver 70, the header data 5, 10 are then decompressed by means of a decompression algorithm, which then reverses the compression of the header data 5, 10 executed by the compression algorithm used.

The IP protocol layer (Internet Protocol), which is introduced below by way of example, prepends a set of header data in the form of an IP header onto the data from higher protocol layers. If the data are received in the IP protocol layer from a higher TCP protocol layer (Transport Control Protocol), then these data can contain the payload data 15 and a prepended TCP header 10. The IP protocol layer then also prepends the IP header 5 onto the TCP header 10 so that an IP/TCP header 5, 10 is generated, which is prepended onto the payload data 15 according to FIG. 1. Correspondingly, an IP/UDP header 5, 20 (UDP=User Dataframe Protocol) is prepended onto the payload data 15 of the packet data unit 1 if the data have been received in the IP protocol layer from a UDP protocol layer.

Compression algorithms in the sender are used to reduce the data quantity of the header data 5, 10, 20. The compression of header data 5, 10, 20, which are based on the Internet Protocol (IP), is described in references D2 and D3 and will be described briefly below in order to explain the method according to the invention.

Reference D2 describes a method for compressing IP headers 5 in combination with TCP headers 10 or UDP headers 20. The method is based on the single transmission of a complete combined IP/TCP header 5, 10 of this kind or of a complete IP/UDP header 5, 20, which is stored in a compressor of the sender and in a decompressor 45 of the receiver 70, under a particular identifier CID (Contest Identifier). In this case, the headers are naturally sent along with the corresponding packet data unit 1. In the subsequent packet data units, those parts of the header data, which do not change or which constantly change, are then no longer transmitted with the header data 5, 10, 20. Parts of header data 5, 10, 20 that change unpredictably are either transmitted to the receiver 70 whole along with the corresponding associated packet data unit 1, or only the changes in the header data 5, 10, 20 compared to the last packet data unit sent are transmitted to the receiver 70. The header data 5, 10, 20 stored in the decompressor 45 according to FIG. 5, under the respectively associated identifier CID, are then updated or refreshed based on the header data 5, 10, 20 received along with the subsequently transmitted packet data units 1. In reference D2, the following different types of header data 5, 10, 20 are defined:

1. Regular header for uncompressed IP-based header data, for example IP/TCP header data 5, 10 according to FIG. 1 or IP/UDP header data 5, 20 according to FIG. 2, which contain no other compression-related data (type 1).

2. Full header for uncompressed IP/TCP header data 5, 10 or uncompressed IP/UDP header data 5, 20 with additional compression-related data (type 2).

3. Compressed_TCP for compressed IP/TCP header data according to FIG. 1 (type 3).

4. Compressed_TCP_NON_DELTA for header data 5, 10, 20 in which only the data, which do not change or which constantly change, are omitted, but all other data are transmitted in a complete, compressed format (type 4).

5. Compressed_NON-TCP for compressed header data 5, 20, which are not IP/TCP header data 5, 10, but in particular IP/UDP header data 5, 20 according to FIG. 2 (type 5).

6. Context_state for header data, which are sent back from the receiver 70 to the sender or from the decompressor 45 to the compressor as an acknowledgment and for the synchronization of header data stored in the decompressor 45 and which do not play any role in the method according to the invention (type 6).

Header data of type 1 are not compressed.

Header data of type to represent complete header data, which are to be stored in the decompressor 45, under the associated identifier CID.

Header data types 3, 4, and 5 are compressed header data, and header data of type 6 are used for purposes of synchronizing the header data stored in the decompressor 45 and are sent from the decompressor 45 of the receiver to the compressor of the sender.

The method described in reference D3 is based on the method described in D2, but is only used for packet data units 1 whose payload data 15 have had a set of RTP header data 25 according to FIG. 3 prepended onto them in an RTP protocol layer (Real Time Protocol). In the subordinate UDP protocol layer, a UDP header 20 has also been prepended onto the thus generated packet data unit. In the subordinate IP protocol layer, the packet data unit thus generated in the UDP protocol layer has further IP header data 5 prepended onto it, thus generating the packet data unit 1 shown in FIG. 3. The header data 5, 20, 25 shown there can also the referred to as IP/UDP/RTP header data. The following types of IP/UDP/RTP header data 5, 20, 25 can be differentiated:

1. Regular header for uncompressed IP-based header data, for example IP/TCP header data 5, 10 according to FIG. 1 or IP/UDP header data 5, 20 according to FIG. 2, which contain no other compression-related data (type 7).

2. Full header for uncompressed IP/TCP header data 5, 10 or uncompressed IP/UDP header data 5, 20 with additional compression-related data (type 8).

3. Compressed_RTP for compressed IP/UDP/RTP header data 5, 20, 25 (type 9).

4. Compressed_UDP for header data in which only the IP/UDP header 5, 20, but not the RTP header 25 have been compressed (type 10).

5. Compressed_NON-TCP for compressed header data, which are not IP/UDP/RTP header data 5, 20, 25 (type 11).

6. Context_state for header data, which are sent back from the receiver 70 to the sender or from the decompressor 45 to the compressor as an acknowledgment and for the synchronization of header data stored in the decompressor 45 and which do not play any role in the method according to the invention (type 12).

If packet data units 1 are transmitted from the sender that contains the compressor, to a receiver 70 that contains the decompressor 45, then the decompressor 45 must be notified as to the nature or type of header data that it is currently receiving. Usually a signaling 30, 35, 40 is used for this, which is added or prepended onto the packet data unit 1 to be transmitted, as shown in FIG. 4.

It is now conceivable for packet data units 1 to be transmitted to the receiver 70 with IP/TCP header data 510, IP/UDP header data 5, 20, or IP/UDP/RTP header data 5, 20, 25. In order to permit an evaluation or decompression of header data of all of the types of header data that can be received in the decompressor 45, these types must be differentiated by means of the signaling 30, 35, 40. According to FIG. 5, the decompressor 45 contains a first group 50 of algorithms for evaluating or decompressing header data of types 1 to 5 and a second group 55 of algorithms for evaluating or decompressing header data of types 7 to 11. No algorithms need to be provided in the decompressor 45 for header data of type 6 or type 12, since these header data are sent from the decompressor 45 of the receiver 70 to the compressor of the sender. Previously, 4 bits were required in order to be able to explicitly signal the ten types of header data that can be evaluated or decompressed in the decompressor 45; one bit was required to select the group 50, 55 of algorithms required for the evaluation or decompression of the respective header data. The remaining three bits were used to differentiate among five different algorithms in each of the two groups 50, 55, in order to supply the five types of header data, which could be evaluated or decompressed in the corresponding group of algorithms, to the correspondingly suitable algorithm for the evaluation or decompression. Therefore, up till the present, four bits for the signaling had to be transmitted along with each packet data unit 1.

The invention makes use of the fact that for the evaluation or decompression of header data of types 1, 2, and 5, algorithms in the first group 50 of algorithms are provided, which correspond to the respective algorithm for evaluation or decompression of header data of types 7, 8, and 11 in the second group 55. This produces a third group 60 in the decompressor 45, with algorithms, which can be used in a shared fashion for various types of header data, and consequently represents an intersection of the two groups 50, 55 of algorithms. Consequently, the third group 60 of shared algorithms includes a first algorithm for evaluating header data of type 1 and type 7, a second algorithm for evaluating header data of type 2 and type 8, and a third algorithm for decompressing header data of type 5 and type 11. In this case, the remaining types of header data to be evaluated or decompressed in the manner described above, either by an algorithm from the first group 50 of algorithms or by an algorithm from the second group 55 of algorithms. In this case, the header data of types 3 and 4 are decompressed by means of a respective algorithm that is only contained in the first group 50 of algorithms, whereas header data of types 9 and 10 are decompressed by means of a respective algorithm that is only contained in the second group 55 of algorithms.

In this manner, it is possible to respectively use a shared signaling for the types 1 and 7 of header data, for the types 2 and 8 of header data, and for the types 5 and 11 of header data so that a total of three shared signalings and four additional signalings for the types 3, 4, 9, and 10, or a total of seven different signalings are required, so that three bits are sufficient for the signaling. In FIGS. 4 and 5, a first signaling bit is labeled with the reference numeral 30, a second signaling bit is labeled with the reference numeral 35, and a third signaling bit is labeled with reference numeral 40.

This is particularly advantageous for telecommunication networks that are embodied as mobile radio networks and in particular are realized using the GSM standard (Global Systems for Mobile communications) or using the UMTS standard (Universal Mobile Telecommunications System) and in which only a limited bandwidth or bit rate is available for the transmission of packet data units.

An evaluation of the signaling 30, 35, 40 takes place in the receiver in a corresponding evaluation unit 65, which, depending on the signaling detected, sends the received packet data unit 1 to either the first group 50, the second group 55, or the third group 60 of algorithms for evaluation or decompression.

A table is used below to give an example for the association of the signaling bits 30, 35, 40 with the individual types of header data:

| signaling bits | | | type |
|---|---|---|---|
| 30 | 35 | 40 | |
| 0 | 0 | 0 | type 1, type 7 |
| 0 | 0 | 0 | type 2, type 8 |
| 0 | 0 | 1 | type 5, type 11 |
| 0 | 1 | 0 | type 3 |
| 0 | 1 | 1 | type 4 |
| 1 | 0 | 0 | type 9 |
| 1 | 0 | 1 | type 10 |

The invention claimed is:

1. A method for transmitting header data from a sender to a receiver in the transmission of packet data units (1) in a telecommunications network depending on a type of the header data (5, 10, 20, 25), comprising the following steps:
    supplying a set of header data (5, 10, 20, 25) received in the receiver (70) of the telecommunications network, depending on its signaling (30, 35, 40), to one of at least two groups (50, 55) of algorithms for an evaluation;
    providing a first algorithm in a first group (50) of algorithms for a first type of header data (5, 10, 20, 25);
    providing a second algorithm in a second group (55) of algorithms for a second type of header data (5, 10, 20, 25), wherein the first algorithm corresponds to the second algorithm;
    combining the signaling (30, 35, 40) for the first type of header data (5, 10, 20, 25) and the signaling (30, 35, 40) for the second type of header data (5, 10, 20, 25) into a shared signaling; and
    transmitting the shared signaling from the sender to the receiver.

2. The method according to claim 1, wherein the signaling (30, 35, 40) is transmitted prepended onto the packet data unit (1).

3. The method according to claim 1, wherein compressed header data (5, 10, 20, 25) of various protocols with various signaling (30, 35, 40), depending on their signaling (30, 35, 40), are supplied to an algorithm from one of the at least two groups (50, 55) of algorithms for decompression.

4. The method according to claim 3, wherein compressed header data (5, 10, 20, 25) of an IPJ TCP protocol (Internet Protocol)/(Transport Control Protocol), depending on their signaling (30, 35, 40), are supplied to an algorithm from the first group (50) of algorithms for decompression.

5. The method according to claim 3, wherein compressed header data (5, 10, 20, 25) of an IP/UDP/RTP protocol (IP/User Dataframe Protocol/Real Time Protocol), depending on their signaling (30, 35, 40), are supplied to an algorithm from the second group (55) of algorithms for decompression.

6. The method according to claim 1, wherein header data (5, 10, 20, 25) of various types with shared signaling, depending on their signaling (30, 35, 40), are supplied to a shared algorithm from the first group (50) and second group (55) of algorithms.

7. The method according to claim 6, wherein uncompressed header data (5, 10, 20, 25) of various types with shared signaling, depending on their signaling (30, 35, 40), are supplied to a shared algorithm from the first group (50) and second group (55) of algorithms.

8. The method according to claim 6, wherein compressed header data (5, 10, 20, 25) of various types with shared signaling, depending on their signaling (30, 35, 40), are supplied to a shared algorithm from the first group (50) and second group (55) of algorithms for decompression.

9. The method according to claim 8, wherein compressed header data (5, 10, 20, 25) of an IP/UDP protocol, depending on their signaling (30, 35, 40), are supplied to a shared algorithm from the first group (50) and second group (55) of algorithms for decompression.

10. The method according to claim 1, wherein header data (5, 10, 20, 25) of at least ten different types are signaled by means of a 3-bit signaling (30, 35, 40).

11. A method for transmitting header data from a sender to a receiver in the transmission of packet data units (1) in a telecommunications network depending on a type of the header data (5, 10, 20, 25), comprising the following steps:
supplying a set of header data (5, 10, 20, 25) received in the a receiver (70) of the telecommunications network, depending on its signaling (30, 35, 40), to one of at least two groups (50, 55) of algorithms for an evaluation;
providing a first algorithm in a first group (50) of algorithms for a first type of header data (5, 10, 20, 25);
providing a second algorithm in a second group (55) of algorithms for a second type of header data (5, 10, 20, 25), wherein the first algorithm corresponds to the second algorithm;
combining the signaling (30, 35, 40) for the first type of header data (5, 10, 20, 25) and the signaling (30, 35, 40) for the second type of header data (5, 10, 20, 25) into a shared signaling;
transmitting the shared signaling from the sender to the receiver, and
supplying uncompressed header data (5, 10, 20, 25) of various types with shared signaling, depending on their signaling (30, 35, 40), to a shared algorithm from the first group (50) and second group (55) of algorithms.

12. A method for transmitting header data from a sender to a receiver in the transmission of packet data units (1) in a telecommunications network depending on a type of the header data (5, 10, 20, 25), comprising the following steps:
supplying a set of header data (5, 10, 20, 25) received in the a receiver (70) of the telecommunications network, depending on its signaling (30, 35, 40), to one of at least two groups (50, 55) of algorithms for an evaluation;
providing a first algorithm in a first group (50) of algorithms for a first type of header data (5, 10, 20, 25);
providing a second algorithm in a second group (55) of algorithms for a second type of header data (5, 10, 20, 25), wherein the first algorithm corresponds to the second algorithm;
combining the signaling (30, 35, 40) for the first type of header data (5, 10, 20, 25) and the signaling (30, 35, 40) for the second type of header data (5, 10, 20, 25) into a shared signaling; and
transmitting the shared signaling from the sender to the receiver, wherein header data (5, 10, 20, 25) of at least ten different types are signaled by means of a 3-bit signaling (30, 35, 40).

* * * * *